United States Patent
Ikeda

(10) Patent No.: US 8,887,097 B2
(45) Date of Patent: Nov. 11, 2014

(54) OBJECT OPENING MENU

(71) Applicant: Hewlett-Packard Development Company, L.P., Houston, TX (US)

(72) Inventor: Akihiko Ikeda, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 225 days.

(21) Appl. No.: 13/658,962

(22) Filed: Oct. 24, 2012

(65) Prior Publication Data

US 2014/0115540 A1    Apr. 24, 2014

(51) Int. Cl.
*G06F 3/048* (2013.01)

(52) U.S. Cl.
USPC ........... 715/835; 715/810; 715/863; 715/769; 345/173

(58) Field of Classification Search
USPC ......... 715/702, 748, 764, 765, 769, 781, 803, 715/804, 810, 835, 863; 345/173
See application file for complete search history.

(56) References Cited

U.S. PATENT DOCUMENTS

| | | | |
|---|---|---|---|
| 6,002,402 A * | 12/1999 | Schacher | 715/810 |
| 6,246,410 B1 * | 6/2001 | Bergeron et al. | 715/854 |
| 7,924,271 B2 * | 4/2011 | Christie et al. | 345/173 |
| 8,319,700 B2 * | 11/2012 | Smith et al. | 345/1.2 |
| 8,629,850 B2 * | 1/2014 | Sengupta et al. | 345/173 |
| 2010/0122194 A1 | 5/2010 | Rogers | |
| 2010/0134432 A1 | 6/2010 | Seo | |
| 2011/0126141 A1 * | 5/2011 | King et al. | 715/769 |
| 2011/0265035 A1 | 10/2011 | Lepage et al. | |
| 2012/0017178 A1 * | 1/2012 | Mulloy et al. | 715/835 |
| 2012/0054778 A1 | 3/2012 | Russell et al. | |
| 2013/0117715 A1 * | 5/2013 | Williams et al. | 715/835 |

OTHER PUBLICATIONS

Unknown., "AntTek Explorer Manual," Retrieved from http://anttek.com/anttek-explorer-manual/, Jun. 13, 2012, 5 pages.

* cited by examiner

*Primary Examiner* — Xiomar L Bautista

(57) ABSTRACT

To display an object opening menu can include a user selection of an unopened object from a first area within a user interface, a user command to relocate a selected unopened object from the first area to a second area within the user interface, and displaying the object opening menu in response to the user command to relocate the selected unopened object to the second area, wherein the object opening menu includes an icon that is associated with an application capable of opening the selected unopened object.

15 Claims, 4 Drawing Sheets

OBJECT OPENING MENU

BACKGROUND

Many computing devices are operable with a mouse and keyboard. A keyboard is an input device for computing devices, containing an arrangement of keys, e.g., modeled after the arrangement of keys on a typewriter. The keyboard keys can be pressed to input data to the computing device. A mouse is a hand-operated electronic device that controls the coordinates of a cursor on the computing device screen, e.g., when moved around on a pad. The mouse can be clicked to input data to the computing device. The mouse and keyboard can be used independently or in conjunction with one another for these computing devices.

Other computing devices are operable with a touch screen. A touch screen is a display that is also an input device. A touch screen can include graphical elements that a user may select, e.g., by touching the graphical element, thereby enabling the user to interact with the computing device without the use of either a mouse or a keyboard.

DETAILED DESCRIPTION

Figure 1A:
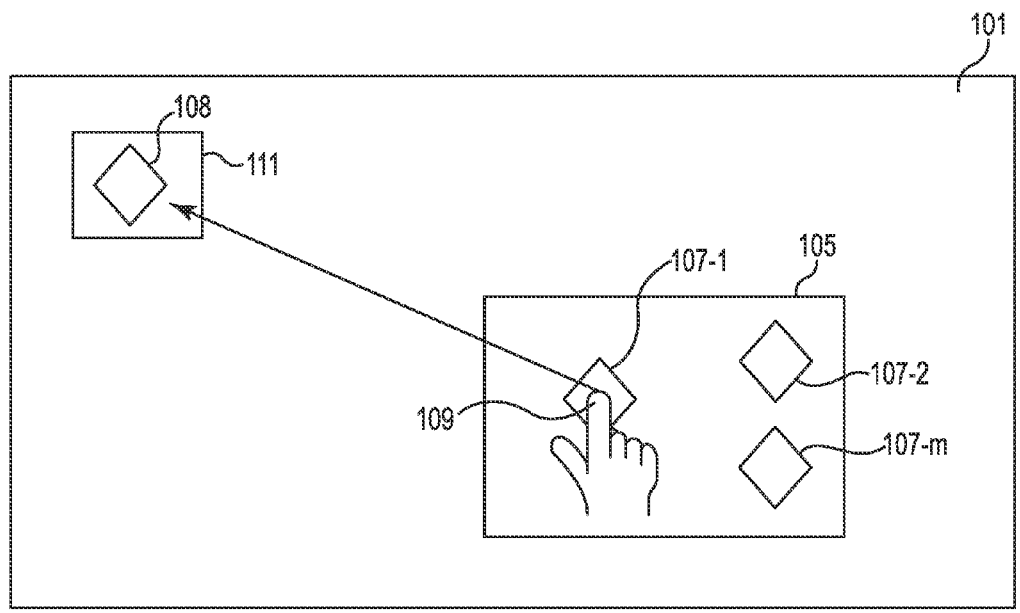
FIG. 1A illustrates a block diagram of a portion of an example of a system for displaying an object opening menu.

As an example, a system for displaying an object opening menu can include a processor resource, a memory resource coupled to the processor resource and encoding instructions, wherein the processor executes the instructions to receive a user selection of an unopened object from a first area within a user interface, receive a user command to relocate the unopened object from the first area to a second area within the user interface, and display the object opening menu in response to the user command to relocate the unopened object to the second area, wherein the object opening menu includes an icon that is associated with an application capable of opening the unopened object.

To open an unopened object, some operating systems initiate an application by a user double clicking with a mouse or double tapping the object on a touch screen, in which case the object is opened with a default application. However, the user may wish to open the unopened object with another application, e.g. an application other than a default application. Additionally, some operating systems initiate an application by a user selecting an application from a context window. The context window is sufficient for selection of an application via a mouse. However, the context menu may be unsatisfactory for some systems, e.g., a touch screen system, where the context menu is too narrow for an accurate finger touch. Examples of the present disclosure may help users open objects with applications other than a default application and/or reduce errors associated with opening objects by providing an object opening menu. The object opening menu can help provide for accurate finger touches and/or help provide selection of an application other than the default application to open an unopened object.

In the present disclosure, reference is made to the accompanying drawings that form a part hereof, and in which is shown by way of illustration how one or more examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit or digits correspond to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1B:
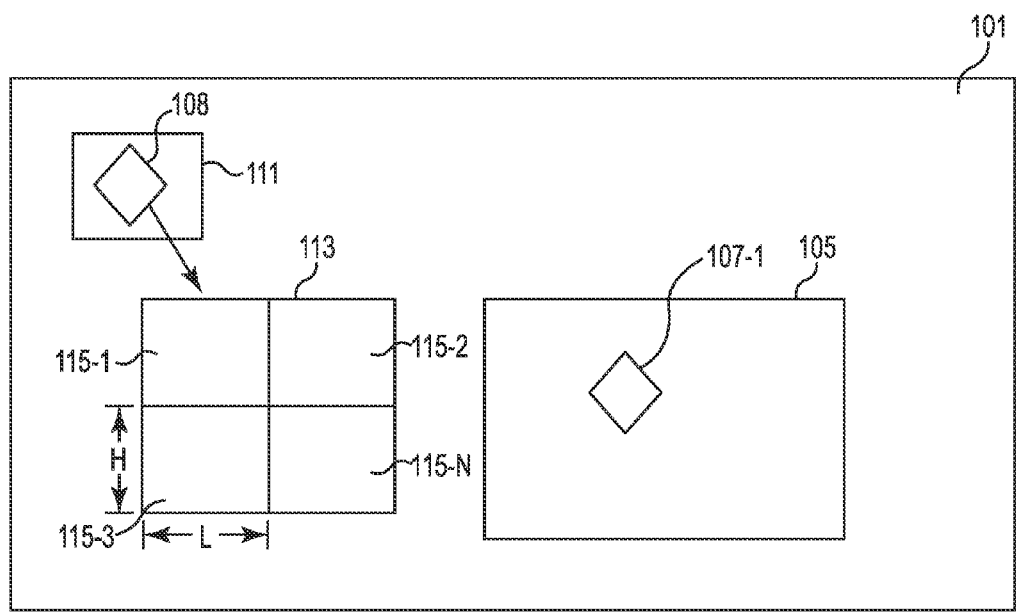
FIG. 1B illustrates a block diagram of a portion of an example of a system for displaying an object opening menu.
Figure 1C:
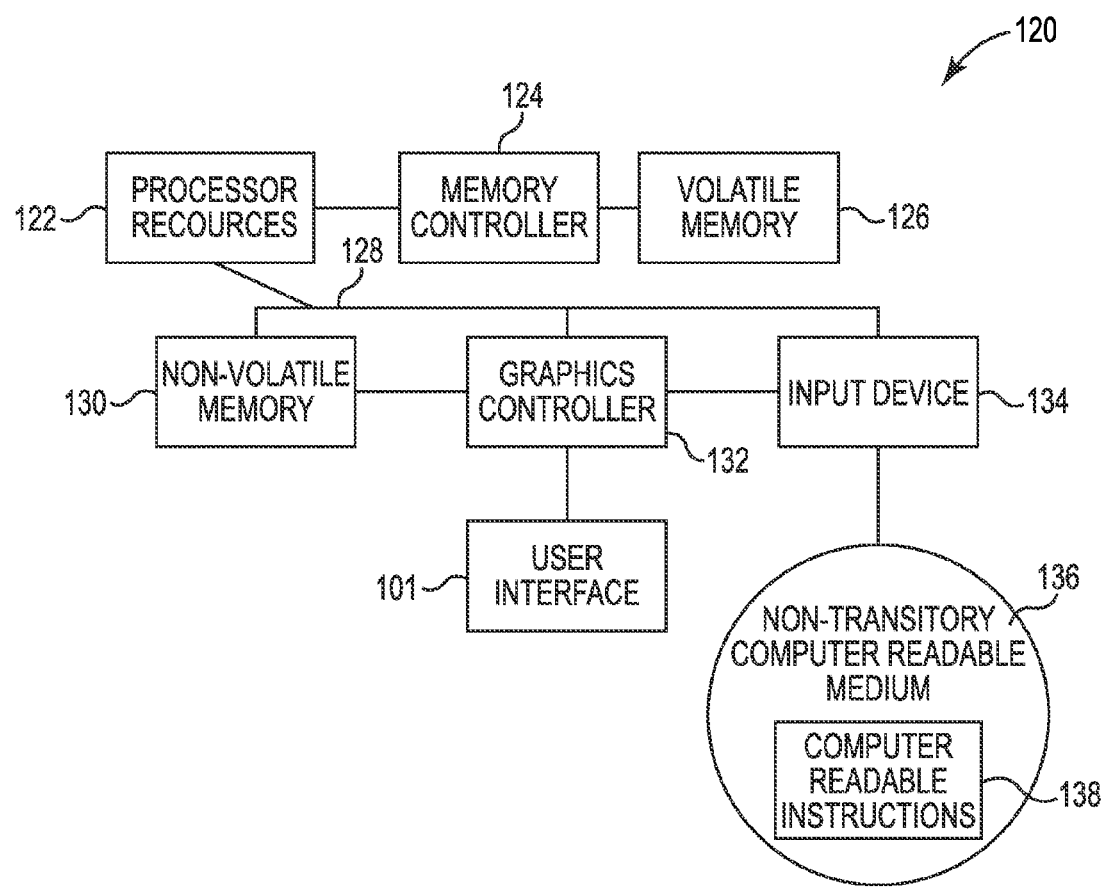
FIG. 1C illustrates a block diagram of an example of a system for displaying an object opening menu according to the present disclosure.

FIG. 1A illustrates a block diagram of a portion of an example of a system, illustrated in FIG. 1C, for displaying an object opening menu as discussed further herein. As illustrated in FIG. 1A, encoding instructions can be executed by processor resources to provide a user interface 101 and to receive a user selection of an unopened object 107-1 from a first area 105 within the user interface 101.

The user interface 101 may include graphical and/or textual information, e.g., such that the graphical and/or textual information is presented to a user. The user interface 101 can include a touch screen. Accordingly, the user interface 101 can utilize a touch screen technology. Examples of the touch screen technology include, but are not limited to, resistive technology, surface acoustic wave technology, capacitive technology, infrared technology, strain gauge technology, optical imaging technology, dispersive signal technology, acoustic pulse recognition technology, frustrated total internal reflection technology, diffused laser imaging technology, and combinations thereof, among others. Examples of the present disclosure provide that the touch screen can include, a liquid crystal display (LCD), a plasma display panel (PDP), a light emitting diode (LED), an organic light emitting diode (OLED), among others. The user interface 101 can be coupled to Windows, Linux, Ubentu, Android, or another operating system.

The first area 105 may occupy a portion of the user interface 101. Some examples of the present disclosure provide that the first area 105 may be associated with a directory and/or a folder. For instance, the first area 105 may be a file folder, e.g., containing a plurality of files. However, examples of the present disclosure are not so limited and the first area 105 may be another type of area within the user interface 101 (e.g. touch screen) where an unopened object 107-1 may be located. The first area 105 can be modifiable, e.g., the first area 105 may be moveable to a different area within the user interface 101. The first area 105 may be scaled up or down in size. The first area 105 may include various, unopened objects, e.g., unopened objects 107-1, 107-2, . . . , 107-M. "M" is an integer that can have various values.

An unopened object 107-1 may be an object that is openable by an application. Examples of the unopened object 107-1, include, but are not limited to, word documents, pdf documents, music files, movie files, or other media files. The unopened object may include an extension. Examples of the extension include, but are not limited to, .doc, .jpg, .exe, .htm, .html, .mp3, .mpg, .zip, .pdf, .png, .xls, .msi, among others.

As mentioned, encoding instructions can be executed by processor resources to receive a user selection of an unopened object 107-1 from a first area 105 within a user interface 101. A user selection may include a finger touch. For instance, a user may touch the unopened object 107-1, e.g., with a finger 109. Some examples of the present disclosure provide a user selection of the unopened object 107-1 from the first area 105 can include a single user touch, e.g., with a finger 109, of the unopened object 107-1 in the first area 105, e.g., in contrast to a double user touch. After the unopened object 107-1 has been touched, the unopened object has been selected and may be referred to as a selected unopened object 108. In some examples of the present disclosure, the user may touch the unopened object 107-1 in the first area 105 more than once, e.g., double user touch the unopened object, to open the unopened object 107-1 with a default application.

As illustrated in FIG. 1A, encoding instructions can be executed by processor resources to receive a user command to relocate the selected unopened object 108 from the first area 105 to a second area 111 within the user interface 101. Some examples of the present disclosure provide that a user command to relocate the selected unopened object 108 may include a finger touch, e.g. when the user interface utilizes drag and drop technology. Drag and drop technology can be considered data transfer technology. For drag and drop technology, a source object, e.g., the unopened object 107-1, can be selected, e.g., by a user's finger touch, and thereafter be moved to another area of the user interface 101, e.g., the second area 111. For instance, a user can select the unopened object 107-1 by touching the unopened object 107-1 with a finger 109 in the first area 105 on the user interface 101. The user can then drag the selected unopened object 108 to a second area 111 of the user interface 101.

The second area 111 can be a predetermined area of the user interface 101 that is different, e.g. a different size and/or location, than the first area 105. The second area 111 within the user interface 101 may be associated with a drop area. For instance, a selected unopened object 108 may be dragged to and thereafter dropped in the drop area, e.g., second area 111. The second area 111 may include a symbol, e.g., an icon, directing the user to drop the selected unopened object 108 in that drop area. The user can drop the selected unopened object 108 in the second area 111, e.g., by removing the user's finger 109 from the user interface 101, to relocate the selected unopened object 108. Once the selected unopened object 108 has been relocated to the second area 111 encoding instructions can be executed by processor resources to display an object opening menu, as discussed herein.

FIG. 1B illustrates a block diagram of a portion of an example of a system, illustrated in FIG. 1C, for displaying an object opening menu as discussed further herein. As illustrated in FIG. 1B, encoding instructions can be executed by processor resources to display an object opening menu 113 in response to the user command to relocate the selected unopened object 108 to the second area 111. Examples of the present disclosure provide that the object opening menu 113 can include a plurality of icons, e.g. 115-1, 115-2, 115-3, . . . , 115-N, each respectively associated with one of a plurality of applications capable of opening the selected unopened object 108. N is an integer that can have various values. The object opening menu 113 may be a grid. The object opening menu 113 can include a number of rows, e.g., as represented by a sequence 1, 2, 3, . . . , –R, where R is an integer. The object opening menu 113 can include a number of columns, e.g., as represented by a sequence 1, 2, 3, . . . , C, where C is an integer. The integer R and the integer C can each have different values for various selected unopened objects 108. Examples of the present disclosure provide that each icon 115-1, 115-2, 115-3, . . . , 115-N, of the object opening menu 113 can be associated, on a one to one basis with a row and column value.

As mentioned, the object opening menu 113 can help provide for accurate finger touches and/or help provide selection of an application other than the default application to open a selected unopened object 108. Some examples of the present disclosure provide that the object opening menu 113 may display each of the plurality of icons as a particular size within a range of sizes. An icon, e.g., 115-1, 115-2, 115-3, . . . , 115-N, may be a graphical representation, textual representation, and/or a combination of graphical and textual representations that is associated with one of the plurality of applications capable of opening a selected unopened object 108. Examples of the present disclosure provide that the particular size of each of the plurality of icons is greater than a size of icons employed with other menus, e.g., context menus, utilized by other systems, e.g., mouse and/or keyboard driven operating systems. Examples of the present disclosure provide that an icon, e.g., 115-3, can have a height (H) in a range from 20 pixels to 144 pixels and a length (L) in a range from 20 pixels to 144 pixels. As such, each of the plurality of icons 115-1, 115-2, 115-3, . . . , 115-N, can have a size in a range from 20 pixels×144 pixels to 144 pixels×20 pixels.

Each of the plurality of icons in the object opening menu 113 may be associated with a particular application capable of opening the selected unopened object 108. For instance, if the selected unopened object 108 is a picture file, the object opening menu 113 may display an icon that is associated with Windows Photo Viewer®, among other applications. In another instance, if the selected unopened object 108 is a word document, the object opening menu 113 may display an icon that is associated with Microsoft Word®, among other applications. Some examples of the present disclosure provide that each icon displayed in the object opening menu 113 is associated with a different application capable of opening the selected unopened object 108. For instance, the object opening menu 113 may display a particular icon 115-1 that is associated with Windows Media Center® and a different icon 115-2 that is associated with Internet Explorer®. Some examples of the present disclosure provide that, an icon may be associated with more than one application, e.g., Windows Live Movie Maker® and Internet Explorer®, among other applications.

Some examples of the present disclosure provide that some of the plurality of icons displayed in the object opening menu 113 can be determined by which applications are available to the system that are capable of opening the selected unopened object 108. For instance, a single icon, e.g., 115-1, may be displayed in the object opening menu 113 when a single application that is capable of opening the selected unopened object 108, e.g., Microsoft Word®, is available to the system. However, in another instance, seven icons, e.g., where N is seven, may be displayed in the object opening menu 113 when seven applications that are capable of opening the selected unopened object 108, e.g., Internet Explorer®; Microsoft Office®; Paint®; Windows Live Movie Maker®; Windows Live Photo Gallery®; Windows Media Center®; and Windows Photo Viewer®; are available to the system. However, examples of the present disclosure are not so limited and the object opening menu 113 can display differing numbers of icons for various selected unopened objects 108.

Some examples of the present disclosure provide that a number and/or type of icon, e.g., each individual application represented by a particular icon, in the object opening menu 113 can be determined by properties particular to the selected unopened object 108. For instance, as mentioned, the selected unopened object 108 may include an extension. The extension may be referenced and used to populate the object opening menu 113. For example, a .png extension of a selected unopened object 108 may be referenced to select applications, represented by the plurality of icons 115-1, 115-2, 115-3, . . . , 115-N, in the object opening menu 113, that are capable of opening a .png file. That is, the object opening menu 113 may display an icon 115-1, . . . , 115-N, for each of the applications that are capable of opening the .png file.

The user may select an icon 115-1 from the object opening menu 113 with a finger touch. For example, the object opening menu 113 can display a plurality of icons 115-1, 115-2, 115-3, . . . , 115-N, e.g., representing a plurality of applications, which are each capable of opening the selected unopened object 108. The user may select the icon 115-1 from object opening menu 113 to initiate an application associated with the selected icon 115-1. The application associated with the selected icon 115-1 may be initiated in response to the user selection. For instance, an application, e.g., Microsoft Word®, may be initiated when the user selects the icon 115-1 associated with that application. The initiated application may then execute to open the selected unopened object 108. In another instance, an application, e.g., iTunes, may be initiated when the user selects an icon 115-2 associated with the iTunes application. Thereafter, the initiated application can open the selected unopened object 108. Some examples of the present disclosure provide that the object opening menu 113 may close after the user selects the icon with the finger touch.

As mentioned, the initiated application associated with the selected icon may open the selected unopened object 108. The initiated application may open in a window, e.g., on the user interface 101. For example, the selected unopened object 108 may open in a window associated with an application, e.g., Microsoft Paint®, when an icon associated with that application is selected by the user. However, the initiated application need not open a separate window for each initiated application. For instance, a single window may open on the user interface 101 when a user selects an icon that is associated with more than one application, e.g., Safari and iTunes applications.

FIG. 1C illustrates a block diagram of an example of a system 120 for displaying an object opening menu according to the present disclosure. However, examples of the present disclosure are not limited to a particular system configuration. The system 120 can include processor resources 122 and memory resources, e.g., volatile memory 126 and/or non-volatile memory 130, for executing instructions stored in a tangible non-transitory medium, e.g., volatile memory 126, non-volatile memory 130, and/or computer readable medium 136, and/or an application specific integrated circuit (ASIC) including logic configured to perform various examples of the present disclosure. The system 120 can include and/or receive a tangible non-transitory computer readable medium 136 storing a set of computer-readable instructions 138, e.g., software, via an input device 134. The computer-readable instructions 138 can be stored in remote memory managed by a server and represent an installation package that can be downloaded, installed, and executed. As used herein, processor resources 122 can include one or a plurality of processors such as in a parallel processing system. Memory resources can include memory addressable by the processor resources 122 for execution of computer-readable instructions. The computer readable medium 136 can include volatile and/or non-volatile memory such as random access memory (RAM), magnetic memory such as a hard disk, floppy disk, and/or tape memory, a solid state drive (SSD), flash memory, phase change memory, etc. In some examples, the non-volatile memory 130 can be a database including a plurality of physical non-volatile memory devices. In various examples, the database can be local to a particular system or remote, e.g., including a plurality of non-volatile memory devices 130. A computing device having processor resources can be in communication with, and/or receive a tangible non-transitory computer-readable medium storing a set of computer-readable instructions, e.g., software, for displaying an object opening menu, as described herein.

The processor resources 122 can control an operation of the system 120. The processor resources 122 can be connected to a memory controller 124, which can read and/or write data from and/or to the memory, e.g., RAM. The memory controller 124 can include an ASIC and/or a processor with its own memory resources, e.g., volatile and/or non-volatile memory. The memory can include one or a plurality of memory modules, e.g., chips.

The processor resources 122 can be connected to a bus 128 to provide for communication between the processor resources 122, and other portions of the system 120. A graphics controller 132 can connect to a user interface 101, which can provide an image to a user based on activities performed by the system 120. Examples of the present disclosure provide that the user interface 101 includes a touch screen, as discussed further herein.

The instructions 138 can be executed by the processor resources 122 to perform the features and functions described herein. For example, the instructions can be executed to receive a user selection of an unopened object from a first area within a user interface 101. The instructions can be executed to receive a user command to relocate the unopened object from the first area to a second area within the user interface 101. The instructions can be executed to display the object opening menu in response to the user command to relocate the unopened object to the second area, wherein the object opening menu includes an icon that is associated with an application capable of opening the unopened object.

Figure 2:
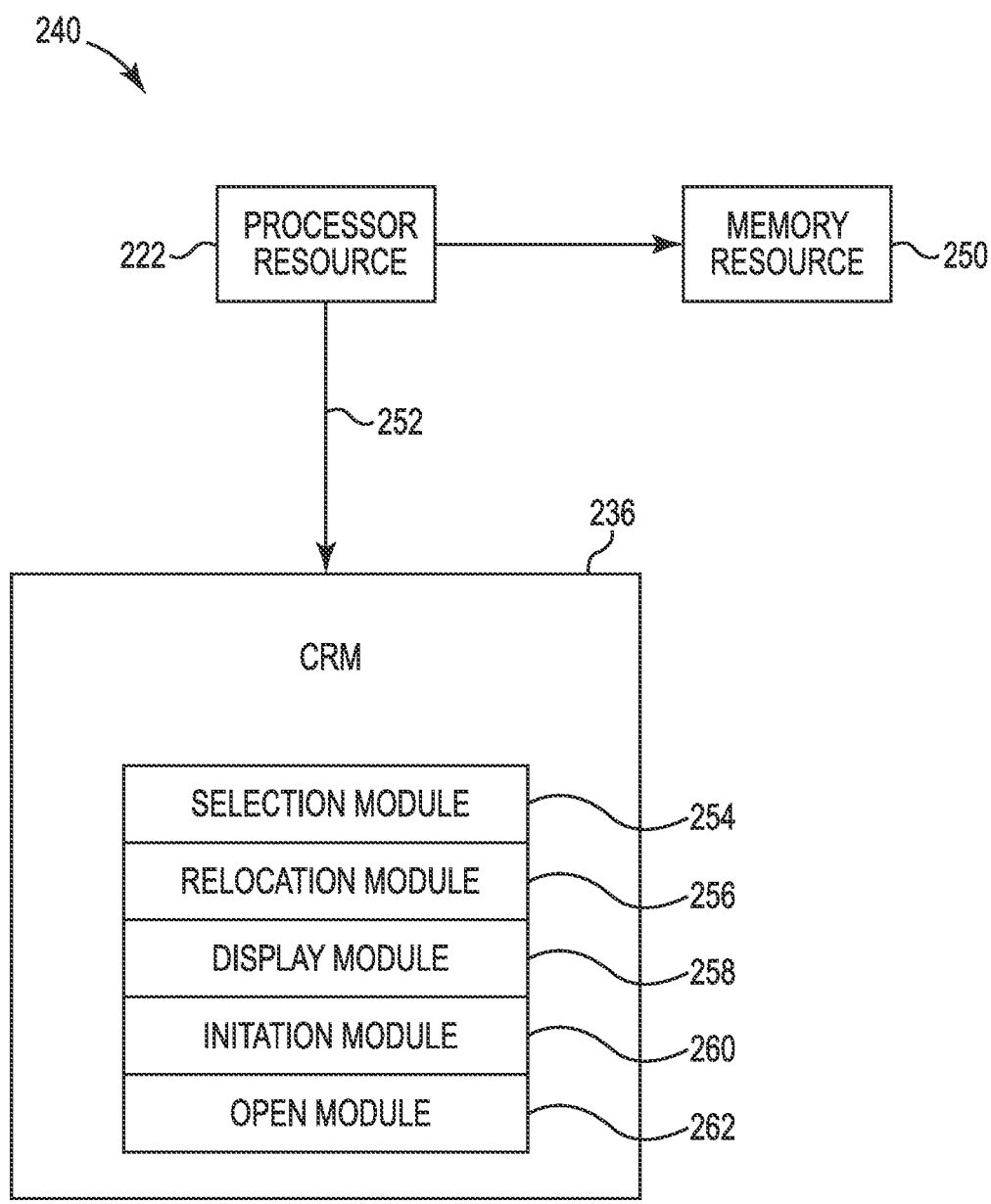
FIG. 2 illustrates a computer-readable medium for displaying an object opening menu according to the present disclosure.

FIG. 2 illustrates a computer-readable medium 236 for displaying an object opening menu according to the present disclosure. The computer-readable medium 236 may be utilized with a computing device 240. The computing device 240 can utilize software, hardware, firmware, and/or logic. The computing device 240 can utilized with the computer-readable medium 236 to store and to execute instructions, e.g., as described in association with FIGS. 1A-1C.

The computing device 240 can be a combination of hardware and program instructions. The hardware, for example, can include one or more processor resources 222, and the computer-readable medium (CRM) 236, e.g., machine-readable medium, database, among others. The program instructions (e.g., computer-readable instructions (CRI)) can include instructions stored on the CRM 236 and executable by the processor resources 222 to implement a function, e.g., display an object opening menu, as discussed herein.

The processor resources 222 can be in communication with the tangible non-transitory CRM 236 storing a set of CRI executable by one or more of the processor resources 222, as described herein. The CRI can also be stored in remote memory managed by a server and represent an installation package that can be downloaded, installed, and executed. The computing device 240 can include a memory resource 250, and the processor resources 222 can be coupled to the memory resource 250.

Processor resources 222 can execute CRI that can be stored on an internal or external non-transitory CRM 236. The processor resources 222 can execute CRI to perform various functions, including the functions described in association with FIGS. 1A-1C. For example, the processor resources 222 can execute CRI to receive a user selection of an unopened object from a first area within a user interface.

The CRI can include a number of modules 254, 256, 258, 260, 262. The number of modules 254, 256, 258, 260, 262 can include CRI that when executed by the processor resources 222 can perform a number of functions.

The number of modules 254, 256, 258, 260, 262 can be sub-modules of other modules. For example, a selection module 254 and a relocation module 256 can be sub-modules and/or contained within the same computing device 240. In another example, the number of modules 254, 256, 258, 260, 262 can comprise individual modules on separate and distinct computing systems.

A selection module 254 can include CRI that when executed by the processor resources 222 can perform a number of functions. For example, the selection module 254 can receive a user selection of an unopened object from a first area within a touch screen, as discussed herein.

Some examples of the present disclosure provide that a relocation module 256 can include CRI that when executed by the processor resources 222 can receive a user command to relocate the unopened object from the first area to a drop area within the touch screen, as discussed herein.

Some examples of the present disclosure provide that a display module 258 can include CRI that when executed by the processor resources 222 can display the object opening menu in response to the user command to relocate the unopened object to the drop area, the object opening menu including a plurality of icons that are each respectively associated with one of a plurality of applications capable of opening the unopened object, as discussed herein.

Some examples of the present disclosure provide that an initiation module 260 can include CRI that when executed by the processor resources 222 can initiate one of the plurality of applications in response to the user selection of one of the plurality of icons, as discussed herein.

Some examples of the present disclosure provide that an open module 262 can include CRI that when executed by processor resources 222 can open the unopened object with the initiated application, as discussed herein.

A non-transitory CRM 236, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 236 can be integral, or communicatively coupled, to the computing device 240, in a wired and/or a wireless manner. For example, the non-transitory CRM 236 can be an internal memory, a portable memory, a portable disk, or a memory associated with another computing resource, e.g., enabling MRIs to be transferred and/or executed across a network such as the Internet.

The CRM 236 can be in communication with the processor resources 222 via a communication path 252. The communication path 252 can be local or remote to a machine associated with the processor resources 222. Examples of a local communication path 252 can include an electronic bus internal to a machine such as a computer where the CRM 236 is one of volatile, non-volatile, fixed, and/or removable storage medium in communication with the processor resources 222 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 252 can be such that the CRM 236 is remote from the processor resources 222 such as in the example of a network connection between the CRM 236 and the processor resources 222. That is, the communication path 252 can be a network connection. Examples of such a network connection can include a local area network (LAN), a wide area network (WAN), a personal area network (PAN), and the Internet, among others. In such examples, the CRM 236 may be associated with a first computing device, e.g., computing device 240, and the processor resources 222 may be associated with a second computing device.

Figure 3:
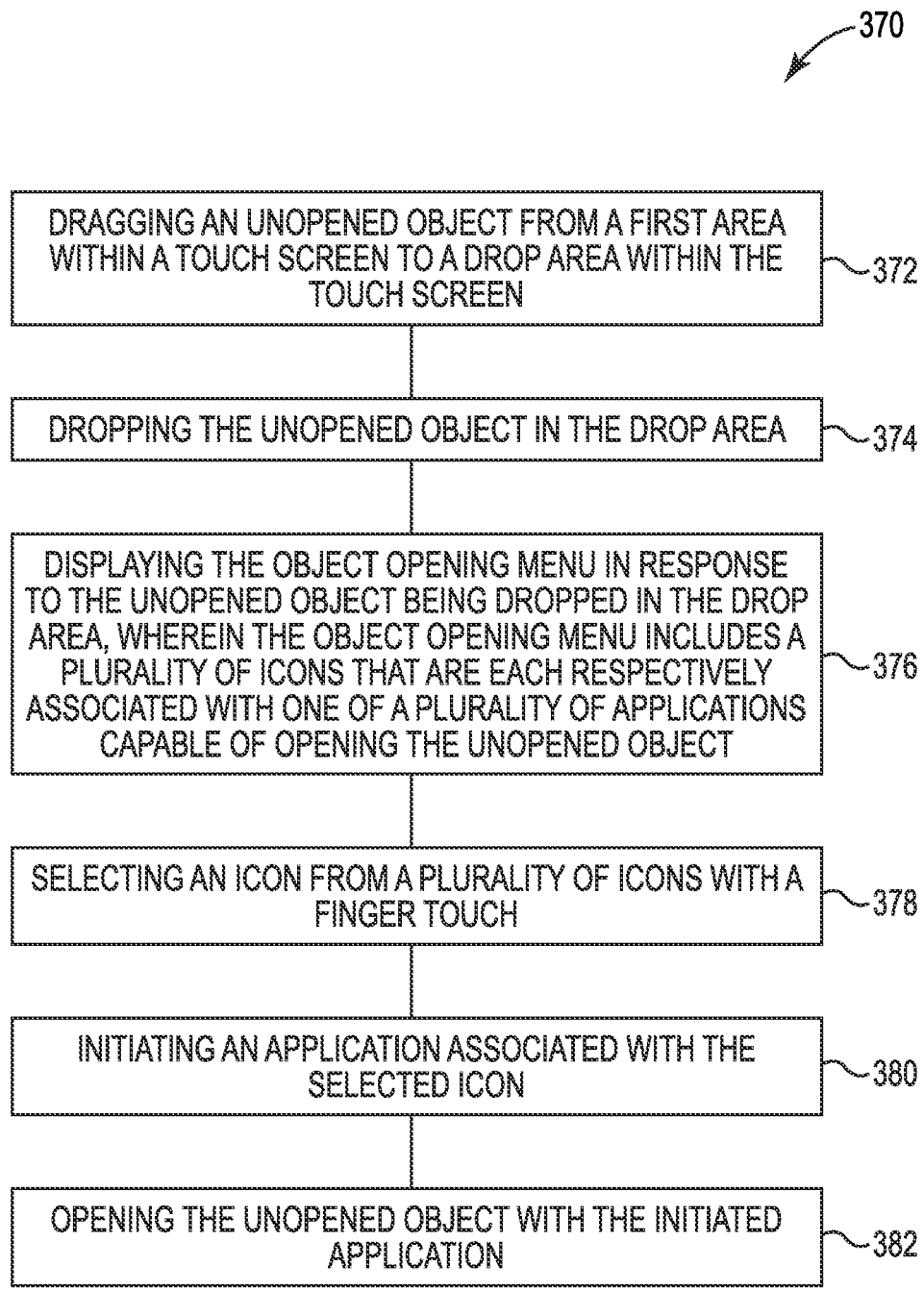
FIG. 3 is a flow chart illustrating an example of a method of displaying an object opening menu according to the present disclosure.

FIG. 3 is a flow chart illustrating an example of a method 370 of displaying an object opening menu according to the present disclosure. Examples of the present disclosure provide that the method 370 is a computer implemented method. For example, the method 370 may be performed in association with a system and/or computing device, as discussed herein.

The method 370 includes dragging an unopened object from a first area within a touch screen to a drop area within the touch screen at 372. As mentioned, the unopened object can include an extension used to populate the object opening menu. The method 370 further includes dropping the unopened object in the drop area at 374. The method 370 further includes displaying the object opening menu in response to the unopened object being dropped in the drop area, wherein the object opening menu includes a plurality of icons that are each respectively associated with one of a plurality of applications capable of opening the unopened object at 376.

The method 370 further includes selecting an icon from the plurality of icons with a finger touch at 378. As mentioned, each of the plurality of icons can be a different icon. The method 370 includes initiating an application associated with the selected icon at 380. The method 370 includes opening the unopened object with the initiated application at 382.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

As used herein, "a" or "a number of" something can refer to one or more such things. For example, "a number of processor resources" can refer to one or more processor resources.

What is claimed:

1. A system for displaying an object opening menu, comprising:
   a processor resource;
   a memory resource coupled to the processor resource and encoding instructions, wherein the processor resource executes the instructions to:
      receive a user selection of an unopened object from a first area within a user interface;
      receive a user command to relocate a selected unopened object from the first area to a second area within the user interface; and
      display the object opening menu in response to the user command to relocate the selected unopened object to the second area, wherein the object opening menu includes an icon that is associated with an application capable of opening the selected unopened object.

2. The system of claim 1, wherein the user interface is a touch screen.

3. The system of claim 1, wherein the user interface utilizes drag and drop technology.

4. The system of claim 1, wherein the user command includes a finger touch.

5. The system of claim 1, wherein the first area is associated with a directory or a folder.

6. The system of claim 1, wherein the second area is associated with a drop area.

7. A non-transitory computer-readable medium storing a set of instructions executable by a processor resource to cause the processor resource to:
   receive a user selection of an unopened object from a first area within a touch screen;
   receive a user command to relocate a selected unopened object from the first area to a drop area within the touch screen;
   display the object opening menu in response to the user command to relocate the selected unopened object to the drop area, the object opening menu including a plurality of icons that are each respectively associated with one of a plurality of applications capable of opening the selected unopened object;
   initiate one of the plurality of applications in response to the user selection of one of the plurality of icons; and
   open the selected unopened object with the initiated application.

8. The non-transitory computer-readable medium of claim 7, wherein the plurality of icons are displayed in a grid.

9. The non-transitory computer-readable medium of claim 7, wherein the user selection of the unopened object from the first area includes a user touch of the unopened object in the first area once.

10. The non-transitory computer-readable medium of claim 7, wherein the user selection of one of the plurality of icons includes a finger touch.

11. The non-transitory computer-readable medium of claim 7, wherein the set of instructions are executable to open the selected unopened object with a default application when a user touches the unopened object in the first area more than once.

12. A computer implemented method of displaying an object opening menu comprising:
   dragging a selected unopened object from a first area within a touch screen to a drop area within the touch screen;
   dropping the selected unopened object in the drop area;
   displaying the object opening menu in response to the selected unopened object being dropped in the drop area, wherein the object opening menu includes a plurality of icons that are each respectively associated with one of a plurality of applications capable of opening the selected unopened object;
   selecting an icon from the plurality of icons with a finger touch;
   initiating an application associated with the selected icon; and
   opening the selected unopened object with the initiated application.

13. The method of claim 12, further including closing the object opening menu after selecting the icon from the plurality of icons with the finger touch.

14. The method of claim 12, wherein each of the plurality of icons is a different icon.

15. The method of claim 12, wherein the selected unopened object includes an extension used to populate the object opening menu.

* * * * *